United States Patent [19]

Vetter et al.

[11] Patent Number: 4,458,482

[45] Date of Patent: Jul. 10, 1984

[54] ROCKET MOTOR

[75] Inventors: Ronald F. Vetter; Theodore A. Hicks; Warren R. Compton, all of Ridgecrest, Calif.

[73] Assignee: The United States of America as represented by the Secretary of the Navy, Washington, D.C.

[21] Appl. No.: 378,581

[22] Filed: May 17, 1982

[51] Int. Cl.³ .............................................. F02K 9/00
[52] U.S. Cl. ................................................... 60/253
[58] Field of Search .............. 60/253, 254, 255, 39.47, 60/917

[56] References Cited

U.S. PATENT DOCUMENTS

| | | | |
|---|---|---|---|
| 2,917,424 | 12/1959 | Hirsch et al. | 154/117 |
| 3,032,975 | 5/1962 | Alden | 60/35.6 |
| 3,130,940 | 4/1964 | Ebb et al. | 244/1 |
| 3,152,548 | 10/1964 | Schwartz | 102/92.5 |
| 3,188,802 | 6/1965 | Davies | 60/255 |
| 3,426,528 | 2/1969 | Mangum et al. | 60/39.47 |
| 3,446,018 | 5/1969 | Macbeth | 60/39.47 |
| 3,583,162 | 6/1971 | Neely | 60/255 |
| 3,713,395 | 1/1973 | Carpenter et al. | 102/103 |
| 3,946,557 | 4/1976 | Macbeth | 60/253 |
| 3,992,997 | 11/1976 | McCubbin et al. | 102/56 R |

Primary Examiner—Louis J. Casaregola
Assistant Examiner—Donald E. Stout
Attorney, Agent, or Firm—Robert F. Beers; W. Thom Skeer

[57] ABSTRACT

A bare patch in an insulating coating on a cylinder is shaped to reinforce stress patterns to cause failure at a predetermined point as a cook-off safety feature.

8 Claims, 5 Drawing Figures

ROCKET MOTOR

BACKGROUND OF THE INVENTION

1. Field of the Invention

This invention relates to heat failure of cylindrical structures. More particularly, this invention relates to a solid propellant rocket motor. Additionally, this invention relates to a solid propellant rocket motor which produces mild burning reactions rather than explosions when exposed to external fires.

2. Description of the Prior Art

Navy carrier operations especially provide the potential for aircraft fuel fires to occur in the vicinity of weapons and ordnance. Many rocket motors react after about one minute of exposure to external fires and flames. The reaction can vary from a mild burning to a violent case rupture.

Past efforts to improve the heat resisting capability of ordnance items have included placing a thermal barrier on the exterior of the rocket motor casing or warhead. By thermal insulation of the rocket motor casing or explosive, the length of time the ordnance item can be exposed to fire without reaction is increased. If the fire is not extinguished within a short period of time, the internal temperature will increase and the ordnance item may ignite and explode.

Explosion and violent rupture of a heat weakened motor can occur when the propellant grain is ignited along the central void in the grain. If combustion can be limited to the outside of the grain and properly vented, the severity of the reaction is lessened.

SUMMARY OF THE INVENTION

This invention overcomes the problems of the prior art by providing an improved failure mode for cylindrical structures. The invention is discribed as it pertains to a rocket motor resistant to violent explosions. While portions of the rocket motor are thermally protected, other selected areas of stress in the casing are left unprotected. This permits buckling of the casing at a point in the unprotected area and a venting of the rocket motor can occur. The grain is positioned such that the venting point is over a thick area of the propellant grain. By proper venting, a violent rupture and explosion is averted.

OBJECTS OF THE INVENTION

Accordingly, it is an object of this invention to provide an improved solid propellant rocket motor.

A further object of this invention is to provide a fire resistant rocket motor which may be safely used in areas prone to fires.

Another object of this invention is to provide a rocket motor which will undergo a small local case rupture and produce a mild burning reaction to prevent a dangerous build-up of interior pressure.

These and other objects of the invention will become more readily apparent from the ensuing specification when taken with the drawings wherein like parts are identified with like numbers and:

DESCRIPTION OF THE PREFERRED EMBODIMENT

Figure 1:
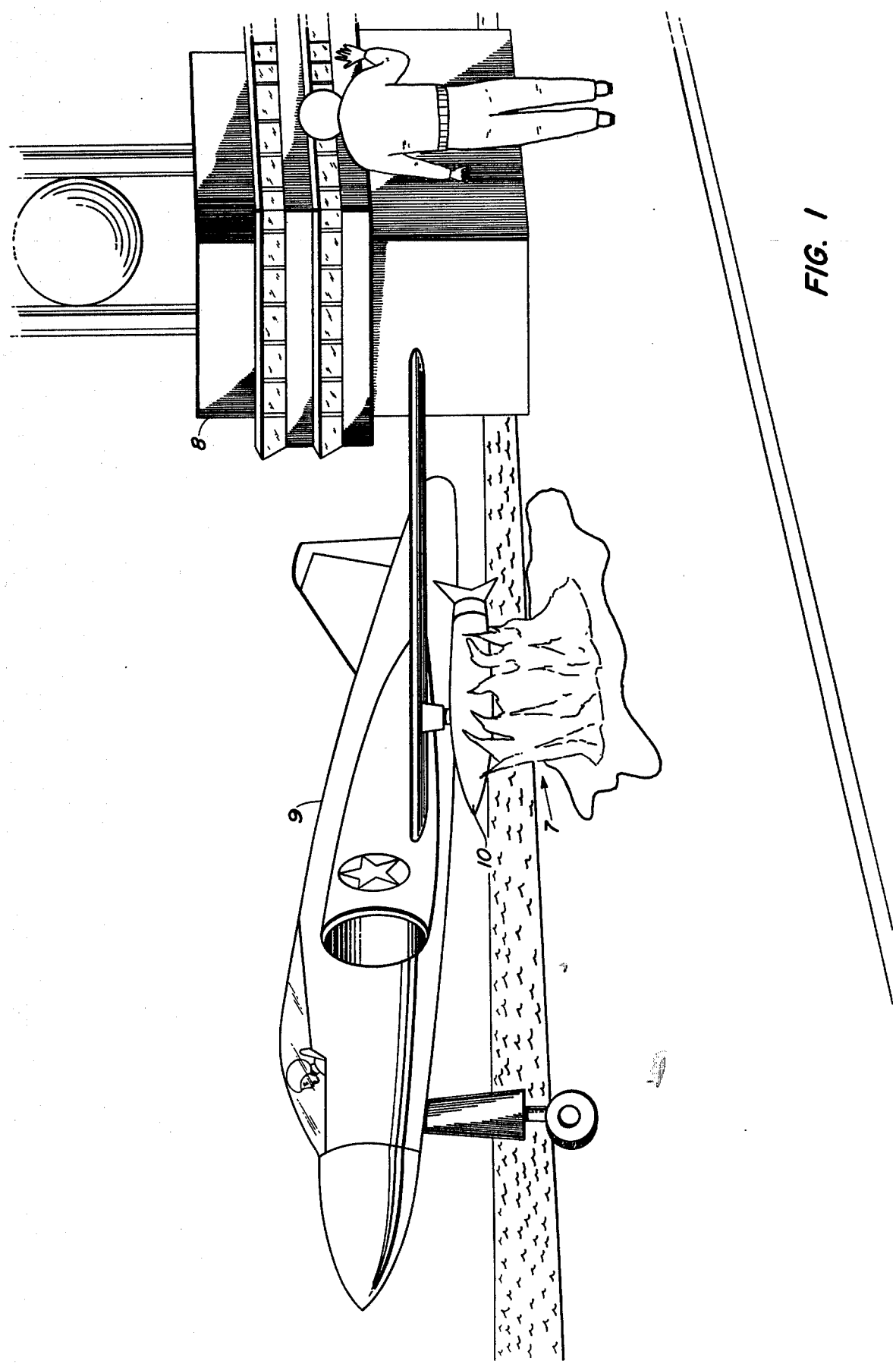
FIG. 1 is a view of the device shown in its operational environment.

Referring to FIG. 1, a rocket motor 10 is seen mounted under an aircraft 9 aboard a ship 8. In this environment, aircraft fuel spillage, such as shown at 7, enemy fire, or other phenomenon can result in occasional fires. Rocket motor 10 can then endanger the crew and damage the ship, if it should react violently to a fire.

Figure 2:
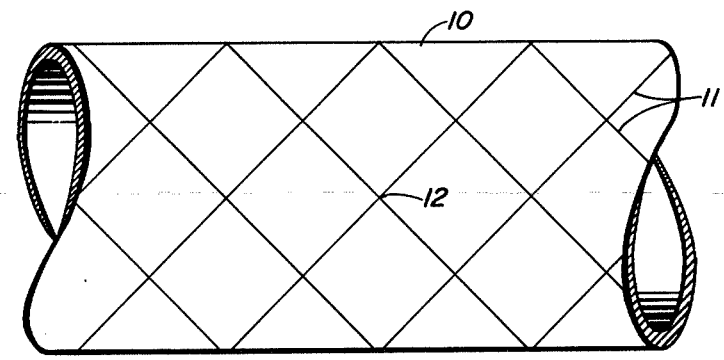
FIG. 2 is a view of the rocket motor showing a pattern of stress "lines"

Referring to FIG. 2, a portion of rocket motor 10 is shown represented by a cylinder. When such a cylinder is subjected to longitudinal loading, as caused by thermal expansion, stress "lines", shown at 11, develop in a criss-cross pattern. The intersections of these stress "lines", points 12, indicate the point where failure will occur in the cylinder or rocket motor 10. By emphasizing the thermally induced stresses, a failure point may be engineered into the construction of the rocket motor. The spacing and stress along these "lines" is a function of the motor casing construction. Although a mathematical analysis is possible, a great number of factors such as weight, thickness, type of case and grain and the thermal properties thereof, and the non-uniformity with which the heat is applied make a concise, accurate description difficult and such calculations are of limited value in a general treatment.

Figure 3:
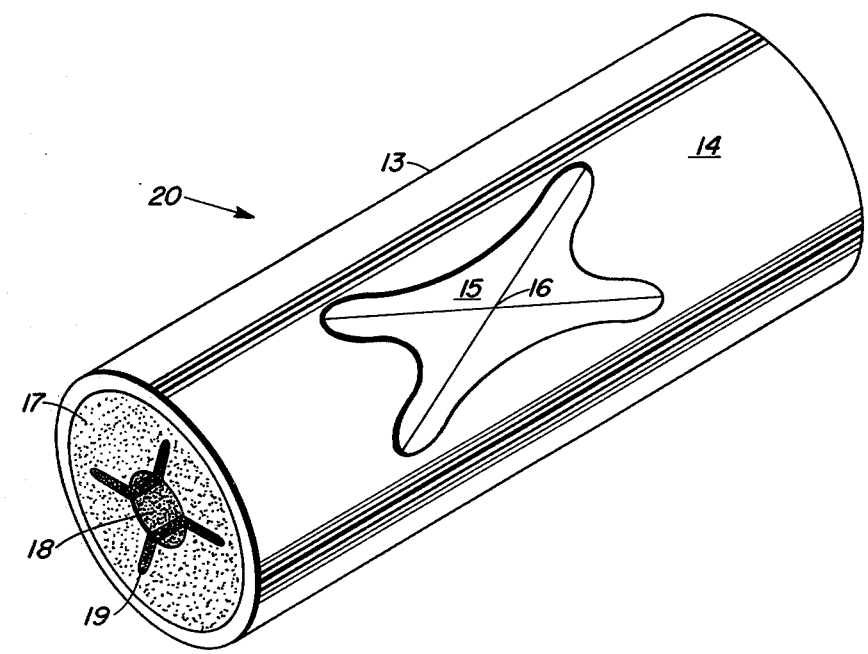
FIG. 3 is a view of the rocket motor showing a pattern of unpainted motor casing.

Referring to FIG. 3, a rocket motor 20 is shown as including a casing 13 constructed from steel or another suitable metal. A coating 14 covers portions of the outside of rocket motor 10. The coating may be of an insulating paint or an intumescent material and should be effective to protect those portions of the outside of rocket motor 10. A bare patch 15 on casing 12 does not receive any thermal coating protection. Bare patch 15 may be masked to prevent coating application or a portion of coating 14 may be removed. When rocket motor 10 undergoes external fuel fire heating, this construction will generate stress at a predetermined stress point 16 because of the longitudinal stresses generated. Bare patch 15 may be a variety of shapes to induce the stress which emphasizes the loading at point 16 which coincides with one of the intersections 11, FIG. 2.

The exact shape of bare patch 15 is chosen after a stress study of rocket motor casing 13. For example, in a cruciform shape, the angle between the arms of the cruiciform may be chosen to be parallel to the stress lines. The intersection of the arms at a point 16 indicates the point at which failure will occur.

The selection of the shape of bare patch 15, like the location thereof, is predetermined by following guidelines determined by study of the particular motor casing. For example, at the edges of bare patch 15 a stress pattern is developed which may reinforce the stress pattern caused by the longitudinal loading produced by the differential heating of bare patch 15. When the coating is of an intumescent material, the heat of direct flame exposure causes sharp corners and other narrow angular shapes to lose their form. As a result, the more gently rounded forms are generally preferable.

The end section of rocket motor 20 shows that casing 13 surrounds a mass of propellant or grain 17. As is conventional, grain 17 has a central void 18 with a plurality of radially extended slots 19. Four slots 19 are shown in this star grain, but any number of radial or longitudinal extensions may be used in accordance with good motor design techniques. The shape of void 18 controls combustion characteristics of the rocket motor. When ignition occurs along this void in a heat weakened motor, destructive explosion or combustion is likely.

Bare patch 15 is preferably located between radial slots 19, so that casing 13 will rupture at a stress point 16 in a region between slots 19. Then, grain 21 will be ignited on a small area and burn in a manner so as to torch a large hole in casing 13, before the grain burns through to slots 19 or void 18. The resultant venting through the torched hole in casing 13 can prevent interior pressure from reaching a dangerous level and causing explosive destruction.

Figure 4:
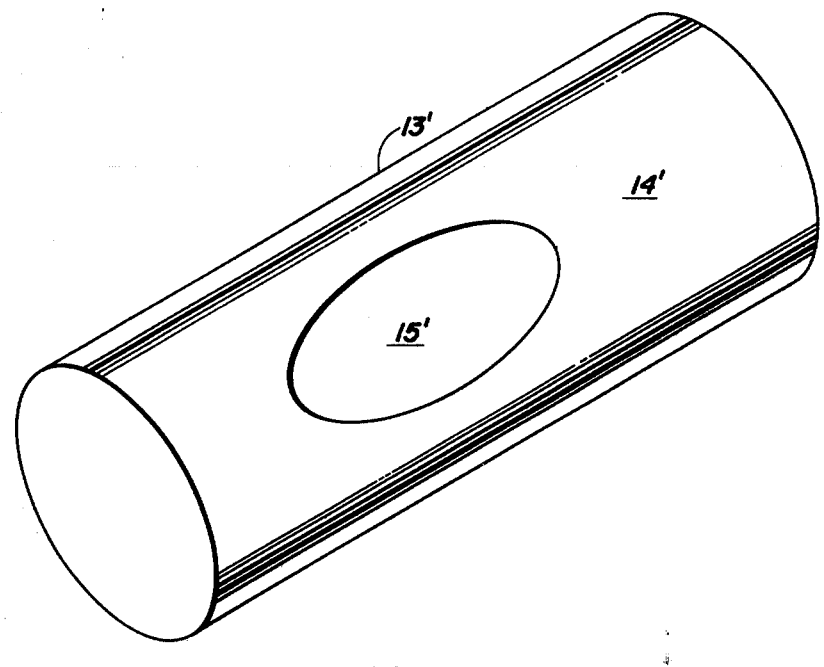
FIGS. 4 and 5 are views of different shaped unpainted areas.

Referring to FIG. 4, a motor casing 13' is illustrated with an oval bare patch 15' in coating 14'. The major axis of the oval bare patch 15' extends along the longitudinal axis of motor casing 13'. Such an orientation favors the reinforcement of the longitudinal stress patterns. If the circumferential stresses, i.e. hoop stresses, are desired to be reinforced, an orientation at right angles to that shown may be desirable.

Figure 5:
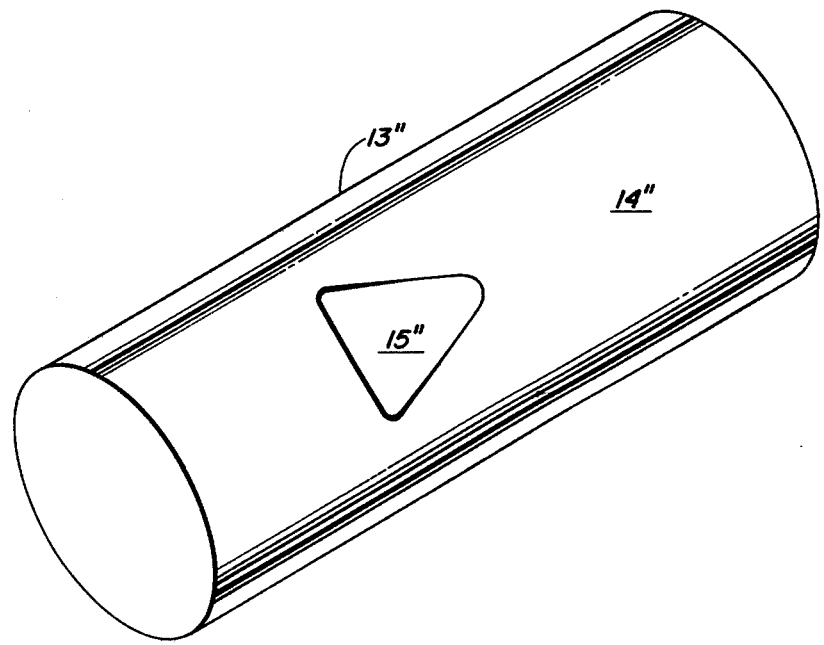

Referring to FIG. 5, a triangular based bare patch 15" is illustrated on a motor casing 13" prime. As pointed out above, the angular points of the triangle are rounded to prevent loss of shape or area covered due to deformation of the intumescent material. Of course, other geometric shapes may prove useful in the practice of the invention. Likewise, if desired, more than a single shape or bare patch may be used on a single casing.

In the illustrated embodiments the failure control bare area may be located on the protected casing at any desired point but generally in a downward direction.

It will also be noted, as pointed out above, that other than rocket motors may benefit from the practice of the invention. For example, railroad tank cars which carry flamable materials or cylindrical load bearing structure may benefit from the practice of the invention.

The foregoing description taken together with the appended claims constitute a disclosure such as to enable a person skilled in rocket motor arts and having the benefit of the teachings contained therein to make and use the invention. Further the structure herein described meets the objects of the invention and generally constitutes a meritorious advance in the art unobvious to such a person not having the benefit of these teachings.

Obviously many modifications and variations of this invention are possible, and, it is therefore understood that within the scope of the disclosed inventive concept, the invention may be practiced otherwise than specifically described.

What is claimed is:

1. A rocket motor having a reduced likelihood of explosion in an external fire, comprising:
   a cylindrical casing;
   propellant grain, having a central void, contained within said casing;
   coating means applied to selected exterior areas of said casing to protect said rocket motor casing from an external fire; and
   a bare portion in said coating means, said bare portion having a shape to intensify heat produced stress in a predetermined area to cause failure at a predetermined point.

2. A rocket motor according to claim 1 wherein said coating means includes:
   insulating paint.

3. A rocket motor according to claim 1 wherein said bare portion is of cruciform shape.

4. A rocket motor according to claim 1 wherein said bare portion is of oval shape.

5. A rocket motor according in claim 1 wherein said bare portion is of triangular shape.

6. A rocket motor according to claim 3 wherein the intersection of said cruciform are at a predetermined location with respect to said center void.

7. A rocket motor according to claim 4 wherein the axis of said oval are at a predetermined location with respect to said center void.

8. A rocket motor comprising:
   a cylindrical casing;
   a propellant grain contained within said casing said propellant grain including,
      a central, axially extending void, and
      a plurality of radial slots extending from said central void toward said casing;
   a heat insulating coating covering substantially all of the exterior of said casing; and
   a bare spot of predetermined shape extending through said heat insulating coating to expose said casing having a center located between adjacent ones of said radial slots, whereby heat generated stress causes casing failure near said center to delay ignition along said central void or radial slots by relieving internal pressure and causing venting through said casing failure.

* * * * *